United States Patent Office 2,702,754
Patented Feb. 22, 1955

2,702,754

PROTEIN, LIGNO-CELLULOSE-FATTY-OIL RESIN

Tatapudy Venkata Subba Rao and Nadipuram Desikachar, Tatapuram, India, assignors to Tata Oil Mills Company Limited, Bombay, India No Drawing. Application March 21, 1950,
Serial No. 151,048

12 Claims. (Cl. 106—123)

The present invention relates to a process for the preparation of resin from protein, lignin and fixed or fatty oil, and also to the resulting resin. The invention has further relation to plastic molding compositions prepared from said resins and to the method of such preparation. Finally, the invention also relates to the making of the said resin and/or the said plastic molding compositions from materials containing the said protein and/or lignin and/or oil, whereby the resin may be obtained in association with non-resinous ingredients. Since three reactants are thus involved in the formation of the resin according to the invention, such resin may be designated a "three-component" resin.

Processes have been proposed from time to time by previous workers for making, inter alia, plastic molding compositions from proteins, such as casein, soya-bean protein and zein, and also for making plastic molding compositions and the like from lignin or ligno-cellulosic material, such as saw dust and bagasse. But it is believed that no process has heretofore been evolved for making plastics from protein or proteinous material, lignin or lignin-bearing material, and fatty oil or fatty oil-bearing material, using all three ingredients—protein, lignin or ligno-cellulose and fatty oil—for the formation of a plastic material of the protein-lignin-oil type.

Processes proposed by previous workers for making protein plastics may be classified thus: (a) processes in which the protein (casein) plasticized with water is extruded in the form of rods or tubes which are subsequently hardened in formaldehyde solution and dried; (b) processes in which the protein (casein, soya-bean protein) is made to react with formaldehyde and the hardened protein-formaldehyde product is extruded in the form of tubes or rods; (c) processes in which the protein (casein, soya-bean meal) is treated with excess phenol and formaldehyde or is mixed with a large proportion of phenol-formaldehyde resin, and the resulting mixture is used for molding, either with or without the addition of fillers such as wood flour. In processes (a) and (b) described above, the high water-absorption of the molded product is a limiting factor for its utility, while method (a) has the additional disadvantage of taking an unduly long time for the process of hardening in formaldehyde solution and subsequent drying. In process (c), these disadvantages are to a great extent overcome, but this process requires the addition of large proportions of phenol and formaldehyde, and the proteinous material may be serving the purpose of a filler or at best as a modifier for the phenolic plastic.

The processes proposed by previous workers for making lignin plastics may be classified as those wherein (a) lignin is mixed with a large proportion of phenol, formaldehyde or phenol-formaldehyde resin, to give a molding composition and (b) ligno-cellulose is obtained in an activated form by the hydrolysis of wood or other ligno-cellulosic material, and is converted into boards and similar products. In the process (a) for making lignin-plastics, large quantities of phenol, formaldehyde, phenol-formaldehyde resin and other resins or resin-forming materials are required and lignin serves more as an extender for those resins, while in (b) the ligno-cellulosic material lacks the flow necessary for making molded articles and hence is limited in utility to the making of flat boards.

It will be seen that the above processes for the manufacture of protein plastics and lignin plastics are far from satisfactory and are of very limited application, particularly in localities where resin-forming materials, such as phenol and formaldehyde, which are needed in large proportions in the above processes, are not manufactured on a sufficiently large scale.

Further, oil cake from expeller or hydraulic press, the chief by-product of the oil crushing industry, is available in large tonnage in agricultural areas and may be used as an important source of protein. But this cake contains about 7 to 10% of residual oil and hence is less suited for making protein plastics by the above processes which generally require pure protein (casein, soya-bean protein, zein) materials which may be of very limited availability, to serve as industrial raw materials. Since it may not always be economical to extract the residual oil from the cake, a demand has arisen in the oil industry for the economic utilization of the expeller or hydraulic press oil-cake as such. Another industrial waste material of wide availability is the lignin-bearing or ligno-cellulosic material, such as saw dust, scrap wood, wood flour, peanut hulls and bagasse, the economic utilization of which is manifestly desirable.

It is known that both protein and lignin are naturally formed plastic materials, and the different processes hereinbefore described were evolved with a view to modifying the properties of the protein or lignin, thereby enhancing its utility as a plastic binder. This is one of the objects of this invention, viz. to produce plastics by the combination of protein, lignin and fixed or fatty oil to yield a product which has better properties than known protein plastic or known lignin plastic. It may be noted in this connection that wood flour (saw dust) has been recommended in some of the protein plastic compositions, but in the latter it serves the purpose of a filler and not that of an active ingredient for the formation of the plastic, as is done according to the present invention.

A further object of this invention is to evolve a process for preparing plastic compositions suitable for molding or other purposes, wherein pure protein, pure lignin and pure oil need not necessarily be used but can be replaced by proteinous material containing, besides the protein, oil and carbohydrates (starch waste from corn or wheat), and lignin-bearing material containing, besides lignin, cellulose, hemi-cellulose and other ligno-cellulosic material such as is found in cereals, oil-cake, scrap wood and wood flour.

A still further object of the invention is to prepare a plastic molding composition from peanut (groundnut) cake, with or without residual oil, and saw dust or scrap wood which, due to the ease of flow, is suitable for the molding of articles, such as bottle caps, shaving bowls, shaving soap containers, soap-boxes, packing containers and laminated boards, which depend for their utility on low water-absorption, good mechanical strength and electrical resistance and which can be made by one of the usual processes of molding, viz. compression, injection and extrusion. Where peanut cake without residual oil is used, the ingredients which are employed include fatty oil as such or material containing such.

Broadly, according to the present invention, the process for preparing a plastic molding composition by the combination of material or materials which bear protein and/or lignin and/or fatty oil, comprises reacting 100 parts by weight of a mixture of such material or materials, providing all three enumerated ingredients, of a particle size of 10 mesh or finer, with water at 150° to 285° C. under a pressure of 50 to 1000 pounds per square inch for a period of time from about 5 minutes to 3 hours, releasing the pressure, removing the solid reaction product from the supernatant liquid, washing the removed solid material with water, and drying and powdering the same. The quantity of water employed may conveniently range from 300 to 1000 parts by weight.

Molded articles according to a feature of the present invention are produced by molding the plastic molding powder, prepared by the process of the invention by compression, injection or extrusion molding at about 140° to 200° C. under a pressure of about 2000 to 5000 pounds per square inch for about 3 to 30 minutes.

The protein or proteinous material (consisting of one or more of the proteins or protein-containing materials hereinafter enumerated) and lignin, ligno-cellulose or ligno-cellulosic material (consisting of one or more of the lignin-bearing waste materials or by-products hereinafter enumerated) are freed from adhering siliceous matter if any, crushed to a particle size of 10 mesh or finer, and mixed. The proportions of proteinous and lignin-bearing materials can be varied to give a protein content of 11 to 33% and a lignin content of 20 to 6% based on the total weight of the mixture. If desired, naturally occurring material such, for instance, as contains protein and lignin in the aforementioned proportions, may be used. It is advantageous to use a proteinous material, such as oil-cake, which contains the requisite quantity of fatty oil, as the proteinous material. To 100 parts by weight of this mixture are added from about 300 to 1000 parts by weight of water, the optimum proportion of water being 600 parts by weight. In order to accelerate the reaction, it is preferred to include a dilute acid, such as sulfuric acid or the like, or an alkaline material, such as caustic soda or lime.

If it be desired to increase the water resistance of the plastic composition being prepared and also, to a certain extent, to increase the mechanical strength of the molded article obtained therefrom, addition agents are added, such as phenol, aniline or furfural, or combinations of these, or material which generates these under the reaction conditions hereafter described, such as rice husks and oat hulls which liberate furfural. The resulting mixture is reacted, preferably in an autoclave, at about 150 to 285° C. under pressure of about 50 to 1000 pounds per square inch for a period of time varying from 5 minutes to 3 hours. The pressure is then released, the solid reaction product is removed from the liquid which is present, whereafter the solid material is washed with water, dried and powdered. This solid matter constitutes the basic plastic composition which, by virtue of its plastic flow under heat and pressure, can be used for making a molded article. To improve the quality and utility of this molding power, small quantities of coloring ingredients, plasticizers, curing agents and fillers may be added, whereafter the final powder may be molded by compression, injection or extrusion molding.

Plastic molding powders of the same basic properties of plastic flow and, hence, utility as a molding composition, are also obtained by the following variations in the aforedescribed general procedure:

1. By using another oil-cake than peanut cake—for example, sesame oil cake or the like—as the proteinous material, and by using saw dust as the ligno-cellulosic material.
2. By carrying out the reaction between proteinous material, lignin or lignin-bearing material and fatty oil at varying pressures within the limits above mentioned.
3. By varying the proportions of the reactants within the range hereinbefore set forth.
4. By varying the proportion of water to solids within the recited range.
5. By varying the pH of the reaction mixture. The reaction can be carried out under pressure in a neutral medium. It is, however, desirable to carry out the reaction in an acid or an alkaline medium.
6. By varying the nature and proportion of the addition agent. Where an addition agent, such as those hereinbefore enumerated is used, the addition of about 1 to 5 parts by weight per 100 parts by weight of the mixture of fatty oil, and proteinous and lignin-bearing material is found to be advantageous.
7. By varying the pressure of autoclaving within the recited range.
8. By varying the mode of discharge of the reaction product from the autoclave. At the end of the autoclaving period, the reaction product may be blown out by suddenly releasing the pressure, or the autoclave may be cooled and the product thereafter discharged.

The product obtained by the aforedescribed procedure and variations thereof can be used as such, or may be mixed with curing agents and placticizers such as furfural, aniline, urea, phenol, formaldehyde, tricresyl phosphate, cashew nut shell liquid (raw, refined or polymerized), phthalic anhydride, coloring ingredients, lubricants and fillers, to give improved products or products of specific utility. The powders thus obtained have good flow and can be molded at temperatures varying from 140° to 200° C., preferably at about 180° C., and under pressure of about 2000 to 5000 pounds per square inch for about 3 to 30 minutes, depending upon the nature and proportion of the curing agents and plasticizers which may be used. Generally speaking, the flow is improved at higher temperatures and pressures, so that reduced curing times may be required under these conditions.

The preferred molding conditions, namely, pressure, temperature and time of curing, according to the present invention, are a temperature of 180° C., a pressure of 4000 pounds per square inch and a curing time of from 3 to 25 minutes. Products molded under these conditions set to a hard mass and can be ejected while hot.

To avoid possible development of cracks, it is preferred to cool the die to about 90° C., whereupon it is opened and the molded article easily removed and polished.

The molded product thus made has low water absorption (3 to 5% as against 10 to 30% for ordinary protein plastics, about 18% for ordinary lignin plastics or 3 to 6% for conventional phenol-formaldehyde modified protein plastics), good impact strength, flexural strength and bending strength. The powder can also be molded after mixing with the phenolic type of molding powder in order to decrease the molding time and increase the water resistance.

The present invention is further characterized by the following illustrative examples of embodiments thereof. The parts and percentages are by weight unless otherwise indicated. Temperatures are in degrees centigrade. Parts by weight bear the same relationship to parts by volume, in these examples, as do grams to cubic centimeters.

Example 1

Fifty parts of ground-nut cake (expeller cake containing 7 to 10% of residual fatty oil) are admixed with 50 parts of saw dust and 600 parts of water, and the mixture autoclaved at a pressure of 150 pounds per square inch for 3 hours. After the autoclave has been allowed to cool, the reaction mixture is removed therefrom, the solid material separated from associated liquid, washed with water, dried and powdered.

To produce a molded article, such as disk, dish, plate or the like, the powdered product obtained as described in the preceding paragraph, is molded in a correspondingly configured die at about 180° and 4000 pounds per square inch pressure for 5 minutes. The molded article is then cooled in the die to 90°, whereupon it is ejected.

Ground-nut cake is also variously referred to as earth-nut cake and peanut cake.

Example 2

A molded product having water absorption characteristics superior to those of the product obtained according to Example 1, i. e. a product whose water absorption is less than in the case of Example 1, is obtained by carrying out the reaction as described in the first paragraph of the latter in the presence of 6.84 parts of $H_2SO_4$ (7.5 parts by volume of 1:1 dilute sulfuric acid).

The molding is, in this case, effected as described in Example 1.

Example 3

By carrying out the reaction as in Example 2, but with the further addition of 5 parts of phenol, and otherwise carrying out the process as described in Example 1, a molded product of even more enhanced water-resistance characteristics is obtained.

The water absorption (the percentage increase in weight over the oven-dry weight, of the molded test piece in the form of a circular disk of 1⅛ inches diameter and 1/12 inch thickness, when the test piece preconditioned in an oven at 50° C. for 24 hours is immersed in water for 48 hours at room temperature) is:

For the product of Example 1_____ 8.16
For the product of Example 2_____ 5.39
For the product of Example 3_____ 4.61

These results compare very favorably with the water absorption characteristics of ordinary protein plastics and ordinary lignin plastics, where the water absorption (as above defined) may be as high as 10 to 30.

The phenol, in the present example, may be replaced by an equivalent quantity of aniline or formaldehyde or cashew nut shell liquid or furfural or urea or zinc oxide. In each case, a molded product of good water absorption characteristics is obtained.

Example 4

Seventy-five parts of peanut cake containing about 10% of residual oil, 25 parts of saw dust, 750 parts of water, 6 parts of H₂SO₄ (in the form of dilute acid) and 5 parts of phenol are mixed together and autoclaved at a pressure of about 200 pounds per square inch for about 2 hours. The material is then worked up as described in Example 1. Due to the higher proportion of protein relative to lignin, the material is found to have a better flow than the corresponding material obtained according to Example 3; the relative mechanical strength is, however, somewhat less. This is not prejudicial in many cases, as for example where the molded product—for instance in the form of an ash tray—is not subject to substantial mechanical stresses.

Where higher mechanical strength is desired, a stronger molded product can be obtained by using 75 parts of saw dust and 25 parts of oil cake, rather than the 25 parts of the former and the 75 parts of the latter specified in the preceding paragraph.

It has also been found that the plastic compositions obtained from the mixture of oil-cake and saw dust according to any of the foregoing examples are different from mere mechanical mixtures of corresponding quantities of individually autoclaved nut cake and autoclaved saw dust, thereby indicating that a reaction takes place when the materials are autoclaved together.

Example 5

(a) The procedure of Example 3 is repeated, using 300 parts of water in lieu of 600 parts.
(b) The procedure of Example 3 is repeated, using 850 parts of water in lieu of 600 parts.
(c) The procedure of Example 3 is repeated, using 1000 parts of water in lieu of 600 parts.

In each case, the molded product corresponds essentially to that described in the first paragraph of Example 3.

Example 6

Fifty parts of cottonseed cake containing about 8% of cottonseed oil, 50 parts of crushed cottonseed hulls, 600 parts of water and a dispersion of 10 parts of lime in 20 parts of water are admixed and autoclaved at a pressure of 50 pounds per square inch for 60 minutes. The reaction mixture obtained from the autoclave at the end of the autoclaving treatment is neutralized with sulfuric acid, the solid portion separated, washed with water, dried and powdered.

The powdered material, molded at a pressure of 2500 pounds per square inch and at a temperature of about 200°, gives a molded article which has low water absorption characteristics.

Example 7

A mixture of 65 parts of sesame oil cake containing about 10% of sesame oil, 35 parts of crushed bagasse, 500 parts of water and 35 parts by volume of 40% aqueous caustic soda solution, is autoclaved at 150 pounds per square inch pressure for a period of 5 minutes. After working up the product of the autoclaving treatment as in Example 6, the powdered product is molded at a temperature of about 140° and under a pressure of about 10,000 pounds per square inch. The obtained product has very low water absorption characteristics.

Example 8

Similarly characterized molded products are obtained by following the procedure according to the foregoing examples, by using any of the following as the starting material which provides the oil and protein for the reaction:

(a) linseed cake containing at least 10% of oil;
(b) cocoanut cake containing at least 10% of oil;
(c) ground-nut cake containing 7 to 10% of oil;
(d) soya bean cake containing residual oil of about 1% or more, and any one of the following as the lignin-bearing material: (a) saw dust, (b) scrap wood, (c) miscellaneous nut hulls, such as peanut hulls, walnut hulls, pecan hulls, (d) wood flour, (e) waste liquors from the paper-making industry, e. g. soda or sulfite processes, and which contain lignin values.

The quantity of water in the mixture to be autoclaved may vary from 300 to 1000 parts, although best results are usually obtained with about 600 parts of water. Accelerators such as sulfuric acid, caustic soda or lime are preferably used. Autoclaving may be carried out at pressures ranging from 50 to 600 pounds per square inch and the time of autoclaving may range from 5 minutes to 3 hours. Generally, an increase in autoclave pressure will decrease the water absorption characteristics of the final product.

The powdered product from the autoclaving treatment may be molded at a temperature varying from about 140° to about 200° and the molding pressure may be as low as 2500 and as high as 10,000 pounds per square inch. Molding at about 180° at a pressure of about 4000 pounds per square inch for products having a wall thickness of about 0.2 inch, generally gives good results. For lower wall thicknesses, lower pressures will suffice; thus a pressure of about 2000 pounds per square inch will give good results for products with a wall thickness of about 0.1 inch.

In so far as these are not indicated to be present in any of the preceding examples, the molding powders obtained may be admixed with suitable quantities of so-called coloring agents, addition agents and/or plasticizers, such as aniline, furfural, urea, phenol, hexamethylenetetramine, dibutyl sebacate, formaldehyde, phthalic anhydride, castor oil, tricresyl phosphate, glucose, etc.

Example 9

A mixture of about 50 parts of mowrah cake, containing about 10% of residual mowrah fat, 50 parts of saw dust, 600 parts of water, 6.84 parts of H₂SO₄ (about 7.5 parts by volume of 1:1 dilute acid) and 5 parts of phenol is autoclaved at a pressure of about 150 pounds per square inch for about 3 hours. The resultant material is then worked up as described in Example 3, whereby a molded product of good water-resistance characteristics is obtained.

Example 10

Solvent-extracted ground-nut cake, which contains about 1% or slightly less of residual oil, is worked up with saw dust, water, sulfuric acid and phenol according to Example 3, to give a product which can be molded under the conditions described in the said example, preferably however with the incorporation of a plasticizer such as dibutyl phthalate or the like.

Example 11

Ground-nut seeds (which may contain as high as 48% of oil) are autoclaved with saw dust and the other ingredients recited in Example 3 and according to the conditions therein recited. Excess of oil can be removed from the reaction mixture from the autoclave by first separating the aqueous phase and then expressing the solid phase, or by extracting the oil with the aid of a suitable solvent such as petroleum ether or benzene. In either case, only uncombined oil is removed. The product, freed from such oil, is then further worked up according to Example 3.

If desired, a mixture of ground-nut cake and ground-nut seeds may be used in lieu of the ground-nut seeds alone, as described in the preceding paragraph. A mixture of the said seeds with other proteinous material, such as casein, other types of oil-cake, etc., may also be used.

The saw dust referred to above may be replaced, if desired, by ground-nut hulls (peanut hulls or any other available nut hulls), as lignin-bearing material.

Example 12

A mixture of 50 parts of soya bean cake (expeller cake containing about 4% of residual oil or solvent extracted cake containing about 1% of residual oil), 50 parts of saw dust, 600 parts of water, 6.84 parts of sulphuric acid (about 7.5 parts by volume of 1:1 dilute acid by volume) and 5 parts of phenol is autoclaved at a pressure of 150 lbs. per square inch for about 3 hours. The resultant material is then worked up as described in Example 3, to get a moldable plastic composition.

Example 13

Thirty parts of casein, 30 parts of lignin (alkali lignin), 30 parts of ground-nut oil, 6.84 parts of H₂SO₄ (about 7.5 parts by volume of dilute 1:1 sulfuric acid), 600 parts of water and 5 parts of phenol are autoclaved at a pressure of about 150 pounds per square inch for about 5 minutes. Excess of oil—i. e. uncombined oil—may be removed from the reaction mixture produced in the autoclave, in the manner described in Example 11. The powdered product obtained after the oil-freed material is washed, dried and powdered, is a pure three-component proteinlignin-oil resin. The powder may be mixed with a filler, such as wood flour, and may then be molded under the condition hereinbefore described in connection with the molding compositions of the previous examples. Thus, a molding temperature of 180° and a molding pressure of about 2000 to 4000 pounds per square inch may advantageously be used here also.

*Example 14*

Fifty parts of the powdered resin obtained according to Example 10 is intimately admixed with 50 parts of the molding composition obtained according to Example 13, and the resulting mixture is then molded under the conditions recited in the last sentence of Example 13.

In general, admixture of a suitable proportion of the powdered resin made according to Example 13 with the molding composition made according to any of the other examples, may be made, and the resultant product molded under the aforesaid or similar conditions. The pure resin generally improves the properties of the other material which, due to the starting materials used for their preparation, contain a non-resinous portion.

*Example 15*

The casein called for by Example 13 is replaced by an equivalent quantity of zein and the mixture otherwise worked up according to the said example. A pure three-component resin is obtained.

In similar manner, other pure proteins may be used in lieu of the casein. The alkali lignin may be replaced by any other fixed or fatty oil, such as those whose cakes have heretofore been mentioned. The various conditions of autoclaving and molding mentioned in the examples starting with protein-bearing and lignin-bearing materials, rather than the pure materials, are also applicable when dealing with the latter. This applies to ranges of temperatures, ranges of pressures, added agents, etc.

*Example 16*

One hundred parts of ground-nut cake, 6.84 parts of $H_2SO_4$ (7.5 parts by volume of sulfuric acid of 1:1 dilution), 5 parts of phenol, and 600 parts of water are autoclaved under the conditions recited in Example 3. The solid reaction product is recovered, washed, dried and powdered.

One hundred parts of saw dust, 6.84 parts of $H_2SO_4$ (7.5 parts by volume of sulfuric acid of 1:1 dilution), 5 parts of phenol, and 600 parts of water are autoclaved under the conditions recited in Example 3. The solid reaction product is recovered, washed, dried and powdered.

Equal parts of the two resultant powders are then admixed and autoclaved under the same conditions. The resultant solid reaction product can be molded under the molding conditions hereinbefore described.

*Example 17*

The hydrolysis of the proteinous material can be carried out in acid alkali or with the help of other hydrolyzing catalyst such as lime and the protein hydrolysate thus obtained can be reacted with lignin or lignin-bearing material as in the other examples.

*Example 18*

The compositions obtained in the above examples have been used for the molding of flat disks, rectangular bars, shallow dishes such as ash trays, cups, bottle caps and the like. The molded articles are characterized by their low water absorption of about 4%, and a high impact strength, good flexural strength and modulus of elasticity and high dielectric strength. (Note—the pure resin is soluble in solvents such as alcohols such as methyl and ethyl, acetone, dioxane. The resin is dark brown in color.)

*Example 19*

75 parts of a molding composition obtained according to the first paragraph of Example 6 are intimately admixed with 5 to 25 parts of comminuted phenol-formaldehyde resin. The resulting molding powder may be molded under the conditions recited in the last paragraph of Example 6. It will be found, however, that a lesser curing time is required and that the molded products can be ejected from the die without the necessity of cooling and also that a tendency for the development of cracks is eliminated. The resultant moldings have good water resistance and strength characteristics.

In lieu of phenol-formaldehyde resin, use may also be made of corresponding quantities of phenol-furfural or modified phenolic resins. In lieu of the molding powder made according to Example 6, use may also be made of a powder made according to any of the other relative examples.

Having thus disclosed the invention, what is claimed is:

1. A process for preparing resinous molding compositions of improved water resistance consisting essentially of reacting a mixture of (a) a protein and fatty-oil bearing oil seed cake selected from the class consisting of peanut-cake, cottonseed, soya bean cake, starch waste cake from corn and wheat waste cake and (b) a lignin bearing material selected from the group consisting of sawdust, bagasse, peanut hulls, evaporated waste liquor from sulfite treatment of wood pulp, and evaporated waste liquors from the soda treatment of wood pulp, said protein and fat bearing oil seed cake added in such proportion to said lignin containing material to provide a mixture containing from about 11% to about 33% of protein, about 6% to about 30% of lignin and about 0.5% to about 7.5% of fatty-oil based upon the total weight of said mixture, said reaction being carried out at about 150° to about 285° C. under a pressure of at least 50 pounds per square inch for at least about 5 minutes in the presence of water in a ratio of about 300 to 1000 parts by weight to about 100 parts by weight of said mixture, and a hydrolyzing catalyst whereby a three component protein-lignin-fatty-oil resin is formed and separated.

2. A process as claimed in claim 1 wherein the protein and fatty-oil are separated, said protein and fatty-oil being added each in an amount of 30 parts to 30 parts of lignin, the remainder being inert filler.

3. A method as in claim 1 wherein said seed cake is peanut-cake.

4. A method as in claim 1 wherein said lignin bearing material is sawdust.

5. The resinous molding composition produced by the process of claim 1.

6. A molded article prepared by molding the composition of claim 5 at temperatures of about 140° C. to 200° C. under a pressure of at least 2000 pounds for a period of time sufficient to cause the composition to flow and conform to the mold.

7. A molding composition consisting of 75–95 parts by weight of the composition prepared in accordance with the process of claim 1 and from 5–25 parts by weight of a powdered phenol aldehyde resin.

8. The resinous molding composition obtained by the process of claim 1 wherein said oil seed cake is peanut-cake and said lignin bearing material is sawdust.

9. A process as claimed in claim 1, wherein the protein and fatty oil bearing material and the lignin bearing material are in a particle size of at least about 10 mesh.

10. A process as claimed in claim 1, wherein the pressure is from 50 to 1000 pounds per square inch, and the reaction time is from 5 minutes to 3 hours.

11. A process as claimed in claim 1, wherein the hydrolyzing catalyst is sulfuric acid.

12. A process as claimed in claim 1, wherein the hydrolyzing catalyst is caustic soda.

References Cited in the file of this patent

UNITED STATES PATENTS

| Number | Name | Date |
|---|---|---|
| 1,892,486 | Dunham | Dec. 27, 1932 |
| 2,007,585 | Satow | July 9, 1935 |
| 2,115,316 | Murray | Apr. 26, 1938 |
| 2,207,069 | Polin | July 9, 1940 |
| 2,315,005 | Polin | Mar. 30, 1943 |
| 2,534,908 | Holzer | Dec. 19, 1950 |

OTHER REFERENCES

Rosenthal, Ind. and Eng. Chem., vol. 34, pages 1154–1157, October 1942.